United States Patent [19]

Kurtz

[11] Patent Number: 4,521,365
[45] Date of Patent: Jun. 4, 1985

[54] GLOVE MOLDING APPARATUS AND METHOD

[75] Inventor: Leonard D. Kurtz, Woodmere, N.Y.

[73] Assignee: Bio Research Inc., Farmingdale, N.Y.

[21] Appl. No.: 563,450

[22] Filed: Dec. 20, 1983

[51] Int. Cl.³ .............................................. B29C 13/00
[52] U.S. Cl. .................................... 264/306; 264/301; 264/305; 425/269; 425/273
[58] Field of Search ....................... 264/301, 306, 305; 425/269, 273, 272

[56] References Cited

U.S. PATENT DOCUMENTS

| | | | |
|---|---|---|---|
| 2,482,888 | 9/1949 | Walsh | 264/306 |
| 3,246,339 | 4/1966 | Sinn et al. | 264/301 |
| 4,340,348 | 7/1982 | Kurtz . | . |

FOREIGN PATENT DOCUMENTS 975436  11/1982  U.S.S.R. ............................. 425/273

Primary Examiner—James Derrington
Attorney, Agent, or Firm—Larson and Taylor

[57] ABSTRACT

An apparatus and method for manufacturing elastomer surgical gloves or the like is disclosed. Ordinarily, a glove mold having a handshaped mold member with spaced fingers is dipped into a tank containing a liquid polymer. As the glove mold is slowly withdrawn, polymer latex webs tend to form between the fingers of the mold. In order to prevent the formation of these webs, small objects such as polyethylene balls are moved fairly rapidly along the surface of the polymer. These small objects pass through the spaces between the fingers to prevent the webs from forming.

8 Claims, 2 Drawing Figures

GLOVE MOLDING APPARATUS AND METHOD

FIELD OF THE INVENTION

The present invention relates generally to the dip molding of articles, and more particularly to an apparatus and method for molding elastomer gloves in which polymer latex web formation between the fingers is prevented.

BACKGROUND OF THE INVENTION

In the manufacture of gloves, such as surgical gloves, a polymer latex coating may be applied to a glove mold as an inner and outer layer on a rubber elastomer layer. This provides a surgical glove with a slip coating so that the surgeon no longer needs to use powder in order to put on the glove. A substantial difficulty has arisen, however, in the use of a dip molding process to form gloves of this type. It has been fond that the polymer latex tends to form webs between the fingers. Although these liquid webs subsequently break, the contents of the web are deposited on the medial and lateral aspects of the finger. This results in a heavy deposition of the suspended polymer on these areas. As a result of this heavy deposition, the polymer latex may flake off when the rubber glove is expanded. Such flaking makes the glove unsuitable for use as an aparticulate surgical glove.

In order to prevent the formation of webs during glove molding, it has been disclosed in U.S. Pat. No. 3,246,339 (Sinn et al.) that the formation of these webbed fingers can be prevented by the addition of oil emulsions or fat emulsions to the latices. In order to prevent webs between the fingers, it has also been disclosed in the prior art to form the fingers of non-rounded, non-horizontal inclined surfaces which join at an apex and define an included angle therebetween. An apparatus for achieving this is disclosed in U.S. Pat. No. 4,340,348 (Kurtz).

SUMMARY OF THE INVENTION

In accordance with the present invention, an apparatus and method for preventing web formation during the molding of gloves or the like is provided. The apparatus includes a tank containing a liquid polymer in which a glove mold is adapted to be submerged. As the glove mold is submerged, a coating of the polymer latex is deposited on the mold. The mold has a handshaped mold member including spaced fingers. A plurality of small objects are provided in the tank which float on the surface of the polymer. These small objects are moved along the surface of the polymer as the glove mold is slowly withdrawn from the tank. The objects therefore move between the fingers of the glove mold and prevent the formation of webs between the fingers.

According to a preferred embodiment of the present invention, the small objects are polyethylene balls. These balls are moved along the surface of the liquid by a liquid pump which circulates a portion of the polymer. The circulating polymer entrains the balls and carries the balls along and past the glove mold. The flow of the circulating polymer and entrained balls is preferably around an inner tank which is disposed in a spaced relationship to an outer tank. The circulating polymer flows around the bottom and opposite sides of the inner tank.

It is an advantage of the present invention that a finished glove which does not flake on extension is provided.

Other features and advantages of the present invention are stated in or apparent from a detailed description of a presently preferred embodiment of the invention found hereinbelow.

DETAILED DESCRIPTION OF THE PREFERRED EMBODIMENT

Figure 1:
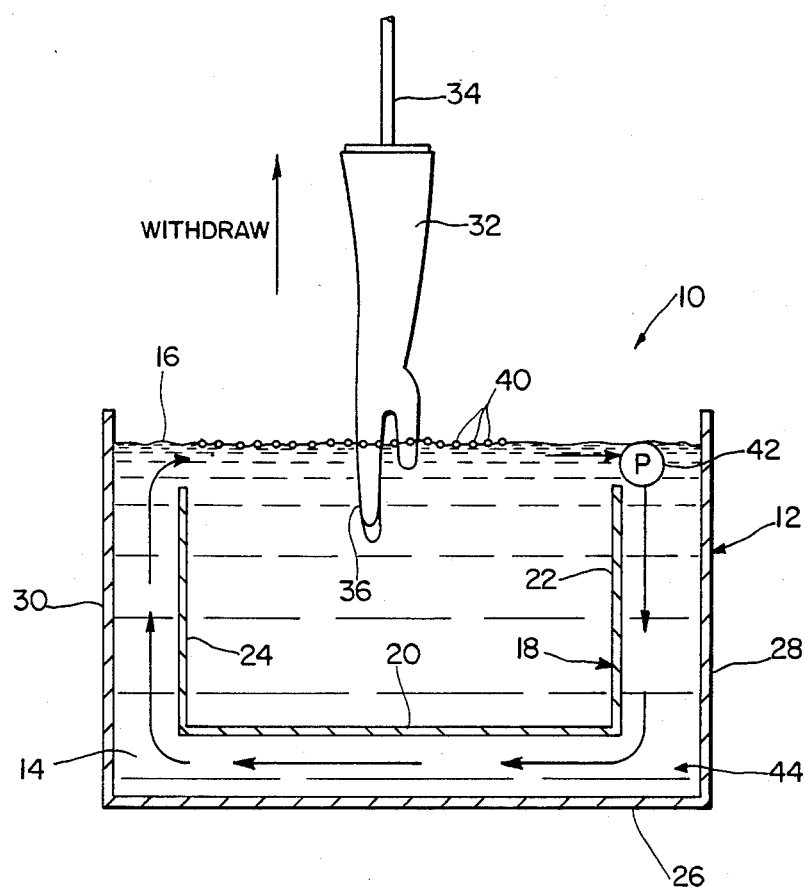
FIG. 1 is a schematic front elevation view of the apparatus for preventing web formation according to the present invention.

With reference now to the drawings in which like numerals represent like elements throughout the two views, a glove molding apparatus 10 is depicted in FIG. 1. Glove molding apparatus 10 includes an outer tank 12 containing a suitable polymer 14. Polymer 14 is a liquid which contains detergents and includes a surface 16. Disposed in outer tank 12 is an inner tank 18. As shown, bottom 20 and sides 22 and 24 of inner tank 18 are spaced from the respective bottom 26 and sides 28 and 30 of outer tank 12. It should be noted that the tops of sides 22 and 24 of inner tank 18 are disposed beneath surface 16 of polymer 14.

Glove molding apparatus 10 also includes a glove mold 32 which is lowered into and withdrawn from polymer 14 by an attached shaft 34. Glove mold 32 is handshaped and includes spaced fingers 36. Conveniently, glove mold 32 is made of porcelain.

Floating on surface 16 of polymer 14 is a plurality of small balls 40. Balls 40 are preferably made of polyethylene and have a relatively small diameter, such as $\frac{1}{8}$ inch. Also located adjacent surface 16 of polymer 14 is a pump 42. As shown in FIG. 1, pump 42 pumps a portion of polymer 14 in a channel 44 under inner tank 18. Channel 44 is defined by respective side walls 22 and 28, bottom walls 20 and 26 and side walls 24 and 30 of inner tank 18 and outer tank 12. Conveniently, pump 42 also pumps balls 40 in the stream of polymer 14 which is pumped through channel 44.

Figure 2:
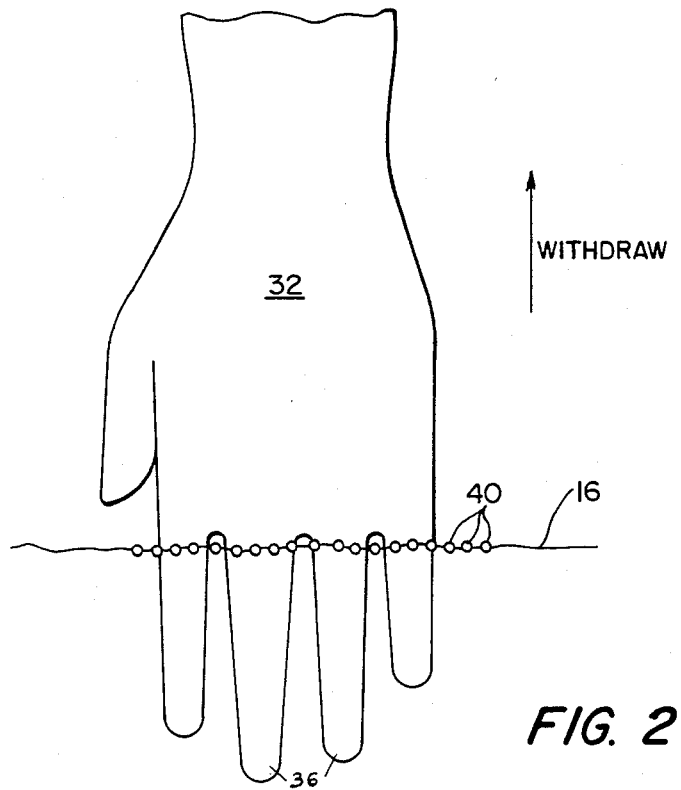
FIG. 2 is a schematic side elevation view of the glove mold depicted in FIG. 1 showing the balls floating on the surface of the polymer and between the fingers of the glove mold.

The method for making a glove or the like while preventing web formation according to the present invention is as follows. Initially, glove mold 32 is inserted in polymer 14 to suitably coat glove mold 32 up to the desired point. Next, as glove mold 32 is slowly withdrawn, pump 42 pumps a portion of polymer 14 through channel 44. This causes balls 40 which are floating on surface 16 of polymer 14 to move across the top of surface 16 fairly rapidly. As shown in FIG. 2, balls 40 pass through the space between fingers 36 as balls 40 are entrained in the moving portion of polymer 14. It should be noted that glove mold 32 is slowly withdrawn so that the circulation of the balls through the interfinger area prevents any polymer latex web formation. The glove mold having the polymer latex layer is then coated with a rubber elastomer layer. Finally, this rubber layer on the glove mold is coated with a polymer latex layer as described above. Once glove mold 32 is finally withdrawn and allowed to dry, an aparticulate glove having a slip coating which will not flake is produced.

Although the present invention has been described with respect to polyethylene balls, it should be appreciated that other small, floating objects can be used in place of polyethylene balls. In addition, the means for circulating the objects between the fingers of the glove mold can be varied so long as the objects are propelled fairly rapidly past the glove mold to prevent web formation between the fingers.

Thus, while the present invention has been deescribed with respect to exemplary embodiments thereof, it will be understood by those of ordinary skill in the art that these and other variations and modifications can be effected within the scope and spirit of the invention.

I claim:

1. An apparatus for preventing web formation during the molding of gloves or the like comprising:
    a tank containing a liquid polymer;
    a mold adapted to be submerged in said tank so as to provide a coating of said polymer on said mold, said mold including a mold member having spaced elements;
    a plurality of small objects, having a diameter of about $\frac{1}{8}$ inch, which float on the surface of said polymer; and
    a moving means for moving said objects along the surface of said polymer as said mold is slowly withdrawn from said polymer whereby said objects move between the elements of said mold and thereby prevent web formation between the elements.

2. An apparatus for preventing web formation as claimed in claim 1 wherein said moving means is a liquid pump which circulates a portion of said polymer in which said objects are entrained past said mold.

3. An apparatus for preventing web formation as claimed in claim 2 wherein said objects are polyethylene balls.

4. An apparatus for preventing web formation as claimed in claim 2 wherein said tank includes an outer tank and an inner tank, said inner tank being disposed below the surface of said polymer in said outer tank and also disposed in a spaced relationship to opposite sides and to the bottom of said outer tank; and wherein said liquid pump circulates said object entraining polymer portion around the bottom and opposite sides of said inner tank.

5. A method for preventing web formation between spaced elements of a mold for gloves or the like comprising the steps of:
    dipping the mold in a tank containing a liquid polymer to coat the mold;
    circulating a plurality of small objects floating on the surface of the polymer past the coated mold wherein said objects have a diameter of about $\frac{1}{8}$ inch; and
    withdrawing the mold slowly from the tank whereby the small circulating objects move between the elements of the mold and thereby prevent the formation of webs between the elements of the mold.

6. A method for preventing web formation as claimed in claim 5 wherein said circulating step includes the pumping of a portion of the polymer past the mold and entraining the small objects in the pumped polymer flowing past the mold.

7. A method for preventing web formation as claimed in claim 6 wherein said objects are polyethylene balls.

8. An apparatus for preventing web formation during the molding of gloves or the like comprising:
    a tank containing a liquid polymer;
    a mold adapted to be submerged in said tank so as to provide a coating of said polymer on said mold, said mold including a mold member having spaced elements;
    a plurality of small polyethylene balls which float on the surface of said polymer; and
    a moving means for moving said polyethylene balls along the surface of said polymer as said mold is slowly withdrawn from said polymer whereby said polyethylene balls move between the elements of said mold and thereby prevent web formation between, the elements.

* * * * *